United States Patent [19]

Swartz et al.

[11] Patent Number: 4,546,992
[45] Date of Patent: Oct. 15, 1985

[54] SPORTCYCLE

[76] Inventors: Harold S. R. Swartz, 907, 738 Third Ave. SW., Calgary, Alberta, Canada, T2P 0G7; Trudy Arthurs, 1630 - 20 Ave. NW., Calgary, Alberta, Canada, T2M 1G8

[21] Appl. No.: 649,068

[22] Filed: Sep. 10, 1984

[30] Foreign Application Priority Data

Apr. 19, 1984 [CA] Canada ................................ 452548

[51] Int. Cl.⁴ ............................................. B62K 5/04
[52] U.S. Cl. ................................... 280/282; 280/202
[58] Field of Search ......... 280/282, 204, 202, 241 LP; 180/211

[56] References Cited

U.S. PATENT DOCUMENTS

D. 149,193 4/1948 Larralde .............................. 280/204
415,740 11/1889 Sharp ................................. 280/282
1,931,685 10/1933 Anderson ........................... 280/204

FOREIGN PATENT DOCUMENTS 918778 11/1946 France ......................... 280/281 LP Primary Examiner—Joseph F. Peters, Jr.
Assistant Examiner—Donn McGiehan
Attorney, Agent, or Firm—George H. Dunsmuir

[57] ABSTRACT

A pedicab with a relatively short turning radius includes a front frame with handle bars on the front end thereof, pedals and a drive sprocket in bearings beneath the handle bars, a driver's seat on the top rear end of the frame and a three-speed hub and driven sprocket on the rear bottom of the frame substantially vertically aligned with the seat, the drive and driven sprockets being connected by an endless chain. A two-wheeled cab is pivotally connected to the rear end of the front frame.

4 Claims, 4 Drawing Figures 4,546,992

SPORTCYCLE

BACKGROUND OF THE INVENTION

This invention relates to a tricycle, and in particular to a pedicab.

Conventional pedicabs resemble the ordinary tricycle, with a front wheel located forwardly of the operator's seat, and a pair of rear wheels rearwardly of the seat on either side of the passenger cab. Such vehicles are quite heavy, long and lacking in maneuverability. Maneuverability is important, particularly in heavy traffic.

The object of the present invention is to provide a relatively simple pedicab, which is relatively short and maneuverable, i.e. which has a small turning radius.

BRIEF SUMMARY OF THE INVENTION

Accordingly, the present invention relates to a pedicab comprising front frame means; seat means for an operator at the rear end of said front frame means; front wheel means rotatably mounted on said frame means for rotation around a horizontal axis substantially vertically aligned with said seat means; handle bar means for steering the pedicab located on the front end of said frame means in front of said seat means; pedal means on said frame means substantially vertically aligned with said handle bar means; drive means connecting said pedal means with said front wheel means for driving said wheel means to propel the pedicab; and cab means pivotally connected to the rear end of said frame means for movement therewith.

BRIEF DESCRIPTION OF THE DRAWINGS

The invention will now be described in greater detail with reference to the accompanying drawings, which illustrate a preferred embodiment of the invention, and wherein.

BRIEF DESCRIPTION OF THE PREFERRED EMBODIMENT(S)

Figure 1:
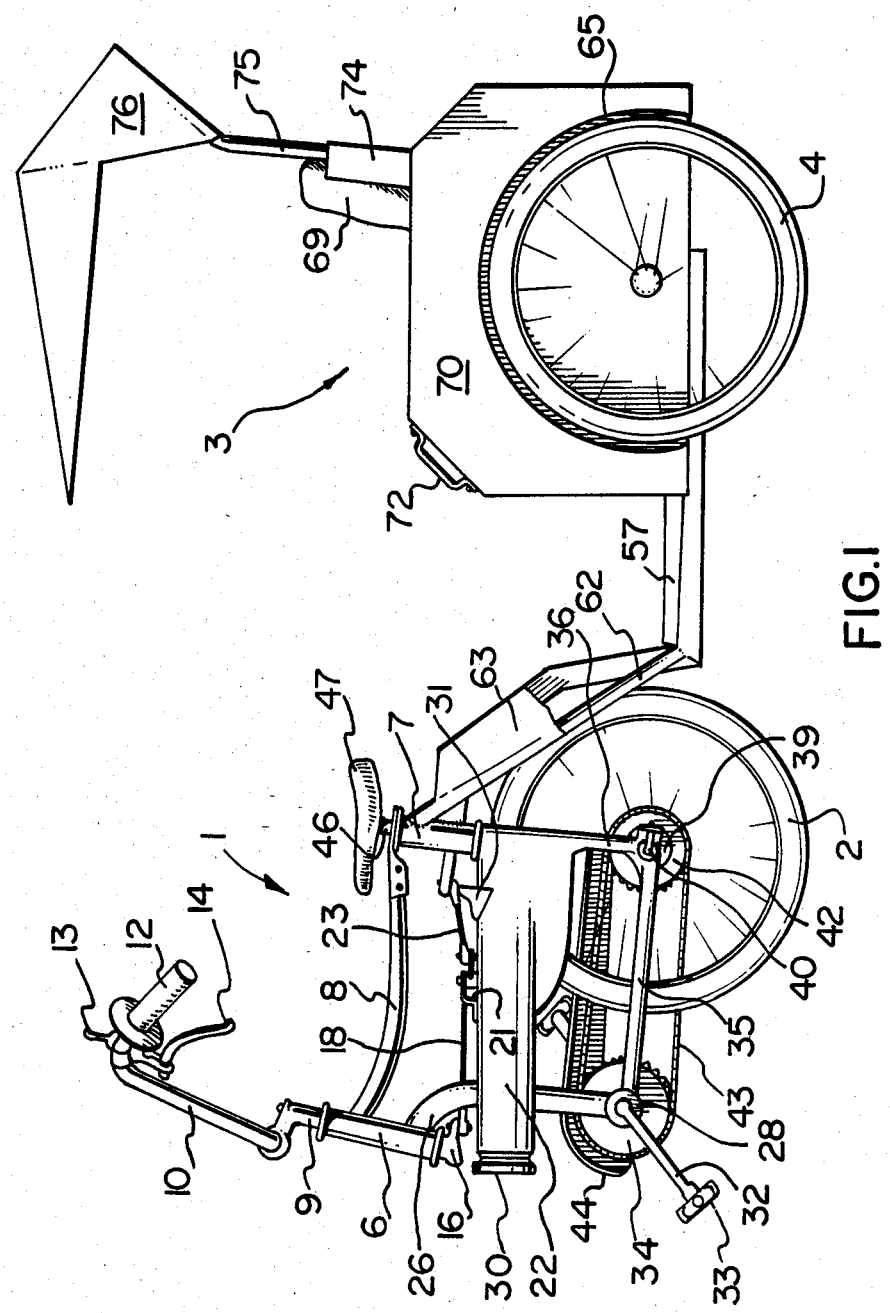
FIG. 1 is a side elevation view of a pedicab in accordance with the present invention.

With reference to the drawings, the basic elements of a pedicab in accordance with the present invention include a front frame generally indicated at 1, a front wheel 2, a cab generally indicated at 3, and a pair of rear wheels 4.

The front frame 1 is defined by front and rear sleeves 6 and 7, respectivly, which are interconnected at their upper ends by a top bar 8. A steering column 9 extends through and is rotatably mounted in bearings (not shown) in the front sleeve 6. Conventional handle bars 10 are provided on the upper end of the steering column 9. The usual hand grips 12, a standard 3-speed gear lever 13 and brake levers 14 are mounted on the handle bars 10.

A front steering lever 16 is provided on the bottom end of the steering column 9. The front end 17 of a linkage rod 18 is pivotally connected to the outer end of the lever 16. The other end 20 of the rod 18 is pivotally connected to one end of a central lever 21, which is pivotally mounted at its centre on the top of a casing 22. One end of a second rod 23 is pivotally connected to the other end of the lever 21, and the other end of the rod 23 is pivotally connected to the outer end of a rear lever 24. The inner end of the lever 24 is connected to the rear sleeve 7 for steering the vehicle.

A bar 26 extends rearwardly and then downwardly from the bottom end of the sleeve 6 through the casing 22 to a bearing 28. A headlight 30 is provided in the front end of the casing 22. A stop defined by a lug 31 for limiting rotation of the rear steering lever 24 is mounted on the casing 22 near the rear end thereof. Conventional pedal arms 32 carrying pedals 33 are mounted in the bearing 28. A sprocket 34 is mounted on the arms 32 for rotation therewith. The bearing 28 is connected by bars 35 on each side thereof to forks 36, which extend downwardly from the rear end of the casing 22. The front wheel 2 with a multi-speed hub 39 containing a coaster brake is rotatably mounted between the forks 36 on axles 40 extending through such forks. A rear sprocket 42 on the hub 39 is connected to the front sprocket 34 by a chain 43. A chain guard 44 is mounted on the front frame 1 above the chain 43. A bar 46 extends upwardly from the top rear end of the casing 27 through the rear sleeve 7 for supporting a driver's seat 47.

Figure 2:
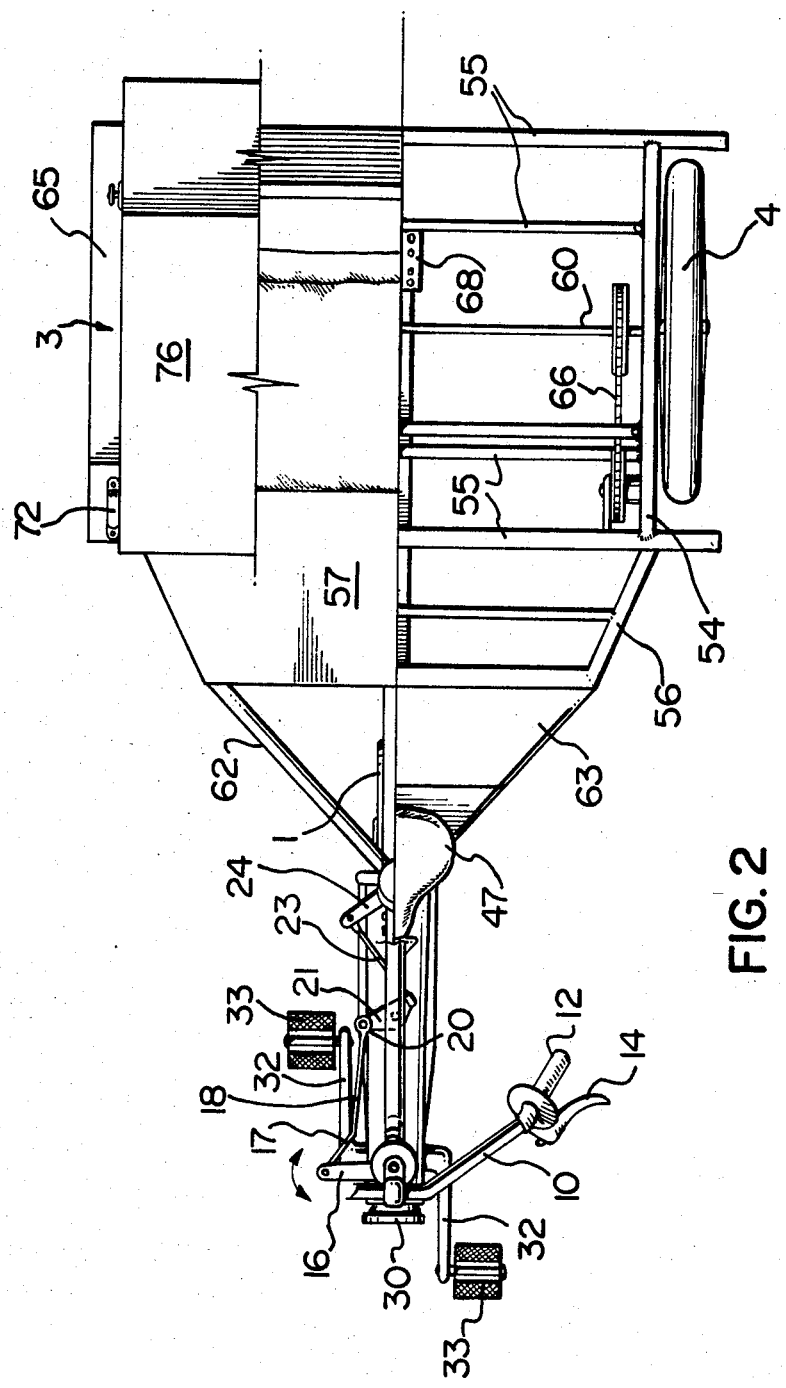
FIG. 2 is a partly sectioned plan view of the pedicab of FIG. 1.
Figure 3:
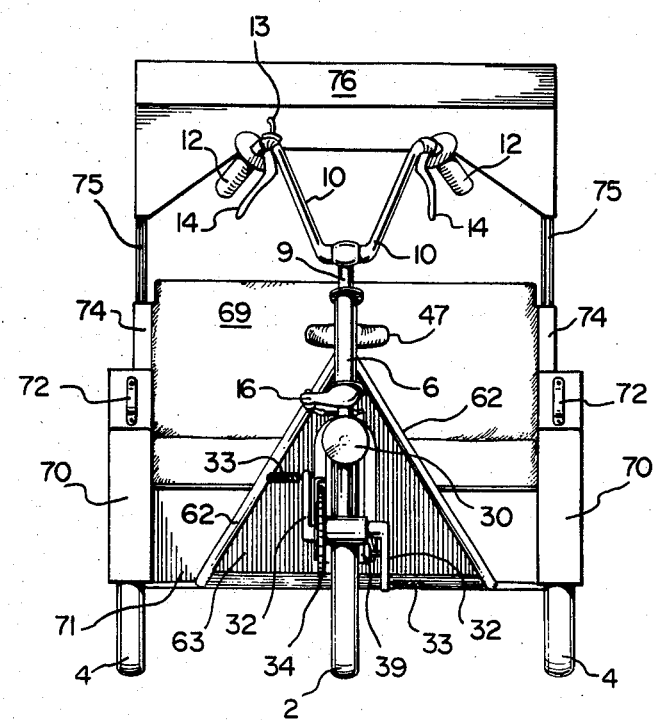
FIG. 3 is a front elevation view of the pedicab of FIGS. 1 and 2.
Figure 4:
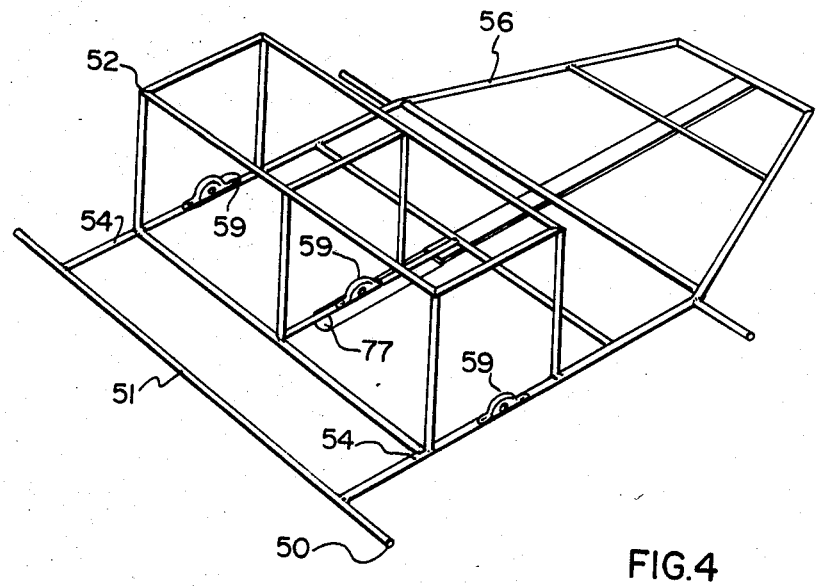
FIG. 4 is a perspective view from above of a cab frame of the pedicab of FIGS. 1 to 3.

The cab 3 includes a skeletal frame 50 (FIG. 4) defined by a flat base 51 and a rectangular seat supporting lever 52. The base 51 is basically rectangular, including longitudinally extending centre bars 54, and tranversely extending bars 55. A forwardly tapering front end 56 of the frame defines the base of a step 57 for passengers to climb onto the vehicle. Three self-aligning bearings 59 are mounted on bars 54 and 77 for rotatably supporting an axle 60 (FIG. 2). The front end 56 of the frame 50 is connected to rear sleeve 7 of the front frame 1 by diagonal bars 62. The bars 62 are covered by a composite plate 63. The rear wheels 4 are mounted in the frame 50 on the ends of the axle 60 outboard of bearings 59 on support bars 54. Standard brakes 66 (one shown) are provided on the axle 60 for the wheels 64. The brakes 65 are connected to the brake levers 14 by coaxial cables (not shown). A battery 68 for providing power to the headlight 30 is mounted on the frame 50 beneath a seat 69. The frame 50 is covered by a lightweight body including sides 70, a back (not shown) and a front 71 (FIG. 3). Hand holds 72 are provided on the front end of the sides 70. The seat back extends upwardly beyond the top edges of the sides 70 and the back of the body. A socket 74 is provided on each side 70 for receiving posts 75 for supporting a canopy 76.

The pedicab is driven in the same manner as a conventional tricycle or bicycle. Because of the design described hereinbefore, i.e. with the front wheel under the driver's seat, the overall length of the vehicle is relatively small, and consequently has a small turning radius. The front wheel 2 is the drive wheel, and turning can be effected equally sharply in either direction. The lug 31 prevents over steering, i.e. turning too sharply in either direction.

What we claim is:

1. A pedicab comprising front frame means: driver seat means for an operator at the rear end of said front frame means; front wheel means rotatably mounted on said frame means for rotation around a horizontal axis substantially vertically aligned with said driver seat means; handle bar means for steering the pedicab located on the front end of said frame means in front of said driver seat means; pedal means on said frame means substantially vertically aligned with said handle bar means; drive means connecting said pedal means with said front wheel means for driving said wheel means to propel the pedicab; and cab means pivotally connected to the rear end of said frame means for movement therewith.

2. A pedicab according to claim 1, wherein said front frame means includes casing means; fork means extending downwardly from the rear end of said casing means for supporting said front wheel means, post means on said casing means above said fork means for supporting said driver seat means; first sleeve means rotatable on the front end of said casing means for rotatably supporting said handle bar means; and second sleeve means rotatable on said post means for connecting said front frame means to said cab means.

3. A pedicab according to claim 1, wherein said cab means includes rear skeletal frame means; rear wheel means rotatably mounted in said rear frame means; body means covering said rear frame means; and passenger seat means on said body means.

4. A pedicab according to claim 3, wherein said rear frame means includes a substantially planar base for rotatably supporting said rear wheel means; and a box on said frame for supporting said passenger seat means.

* * * * *